(12) United States Patent
Ellison et al.

(10) Patent No.: US 11,763,847 B1
(45) Date of Patent: Sep. 19, 2023

(54) HEAT-ASSISTED MAGNETIC RECORDING HEAD, AND RELATED METHODS

(71) Applicant: Seagate Technology LLC, Fremont, CA (US)

(72) Inventors: David James Ellison, Minneapolis, MN (US); James D. Kiely, Edina, MN (US); Neil Zuckerman, Eden Prairie, MN (US); Edwin F. Rejda, Bloomington, MN (US); Joseph Michael Stephan, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/858,277

(22) Filed: Jul. 6, 2022

(51) Int. Cl.
*G11B 5/00* (2006.01)
*G11B 5/31* (2006.01)
*G11B 13/08* (2006.01)

(52) U.S. Cl.
CPC ...... *G11B 13/08* (2013.01); *G11B 2005/0021* (2013.01)

(58) Field of Classification Search
CPC ....... G11B 5/187; G11B 5/265; G11B 5/3116; G11B 2005/0021; G11B 5/314; G11B 5/315; G11B 5/1278; G11B 5/3143; G11B 11/10506; G11B 11/1051; G11B 11/105
USPC ...... 360/59, 328; 369/13.33, 13.34
See application file for complete search history.

(56) References Cited

U.S. PATENT DOCUMENTS

| 9,899,049 | B2 | 2/2018 | Endo et al. |
| 9,934,795 | B1* | 4/2018 | Rivkin ............... G11B 5/315 |
| 10,468,058 | B1 | 11/2019 | Bashir et al. |
| 10,482,907 | B1 | 11/2019 | Mani Biswas et al. |
| 11,094,339 | B1 | 8/2021 | Bergerud et al. |
| 11,094,340 | B1 | 8/2021 | Bergerud et al. |
| 11,222,657 | B1 | 1/2022 | Seigler et al. |
| 2016/0372140 | A1 | 12/2016 | Bian et al. |

* cited by examiner

*Primary Examiner* — Nabil Z Hindi
(74) *Attorney, Agent, or Firm* — Kagan Binder, PLLC (57) ABSTRACT

The present disclosure relates to a recording head that includes a write pole extending to a media-facing surface of the recording head; a near-field transducer extending to a media-facing surface of the recording head; a trailing return pole positioned between the write pole and the trailing edge; and a recessed portion that is recessed relative to the media-facing surface by a distance when no power is applied to the recording head. The trailing return pole is located in the recessed portion. The present disclosure also includes relates methods of making and detecting contact between a recording head and recording medium.

20 Claims, 6 Drawing Sheets

HEAT-ASSISTED MAGNETIC RECORDING HEAD, AND RELATED METHODS

BACKGROUND

There is a continuing need to develop heat-assisted magnetic recording (HAMR) technology, including related recording heads, methods of making such recording heads, and methods of using such recording heads.

SUMMARY

The present disclosure includes embodiments of a recording head, including:
  a trailing edge;
  a leading edge;
  a media-facing surface;
  a write pole extending to a media-facing surface of the recording head;
  a near-field transducer extending to a media-facing surface of the recording head;
  a trailing return pole positioned between the write pole and the trailing edge; and
  a recessed portion that is recessed relative to the media-facing surface by a distance when no power is applied to the recording head, wherein the trailing return pole is located in the recessed portion.

The present disclosure also includes embodiments of a method of forming a media-facing surface and an etched, recessed portion in a recording head, wherein the method includes:
  forming a recording head intermediate that includes at least a write pole, a near-field transducer proximate the write pole, and a trailing return pole positioned between the write pole and a trailing edge of the recording head intermediate;
  lapping the surface of recording head intermediate to form a lapped surface;
  depositing at least a first protective overcoat over the lapped surface;
  patterning a resist or hardmask in a region that encompasses at least the write pole and the near-field transducer;
  etching the first protective overcoat and lapped surface with the resist or hardmask pattern to form a media-facing surface and an etched, recessed portion that is recessed relative to the media-facing surface by a distance when no power is applied to the recording head, wherein the trailing return pole is located in the recessed portion;
  depositing a second protective overcoat over the recessed portion; and
  removing the resist or hardmask.

The present disclosure also includes embodiments of a method of determining contact between a recording head a recording medium, wherein the method includes:
  measuring a signal from a contact detection sensor that is at a media-facing surface of a recording head, the recording head including a write pole extending to a media-facing surface of the recording head; a near-field transducer extending to a media-facing surface of the recording head; and a trailing return pole positioned between the write pole and the trailing edge, wherein the trailing return pole and contact detection sensor are located in a recessed portion recessed portion that is recessed relative to the media-facing surface by a distance when no power is applied to the recording head;
  based on a transition in the signal, determining contact between the recording head the recording medium; and
  based on the determination of the contact, applying a control signal to a clearance actuator of the recording head, the control signal causing the media-facing surface including the write pole and near-field transducer to maintain a head-to-media spacing from the recording medium.

BRIEF DESCRIPTION OF THE DRAWINGS

The discussion below makes reference to the following figures, wherein the same reference number may be used to identify the similar/same component in multiple figures. The schematic figures are for illustration purposes and are not necessarily drawn to scale.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

In some embodiments, an NFT includes an enlarged part which receives light energy from the waveguide and funnels this energy, which is in the form of surface plasmon polaritons (SPP), to an elongated part (e.g., a peg) that extends from the enlarged part towards the recording medium. The peg directs the SPP to the recording medium, which creates a hotspot that facilitates writing via the magnetic field.

Figure 1:
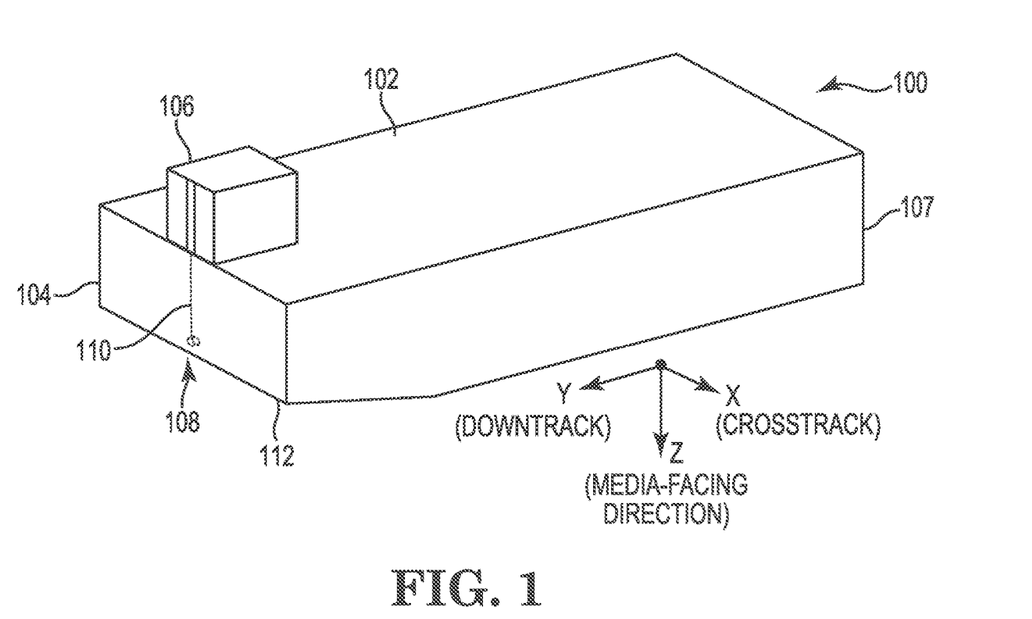
FIG. 1 is a schematic, perspective view of a slider assembly.

In reference now to FIG. 1, a perspective view shows a recording head 100. The recording head 100 may be used in a magnetic data storage device, e.g., HAMR hard disk drive. The recording head 100 may also be referred to herein interchangeably as a slider, head, write head, read head, read/write head, etc. The recording head 100 has a slider body 102 with read/write transducers 108 at a trailing edge 104 that are held proximate to a surface of a magnetic recording medium (not shown), e.g., a magnetic disk. As shown in FIG. 1, trailing edge 104 is opposite leading edge 107.

The illustrated recording head 100 is configured as a HAMR device, and so includes optical components that form a hot spot on the recording medium near the read/write transducers 108. These HAMR components include an energy source 106 (e.g., laser diode) mounted to the slider body 102 and a waveguide 110 (e.g., a dielectric waveguide) integrated into the slider body 102. The waveguide 110 delivers electromagnetic energy from the energy source 106 to a near-field transducer (NFT) that is part of the read/write transducers 108. The NFT achieves surface plasmon resonance and directs the energy out of a media-facing surface 112 (also referred to herein as an air-bearing surface, or ABS) to create a small hot spot in the recording medium.

Figure 2:
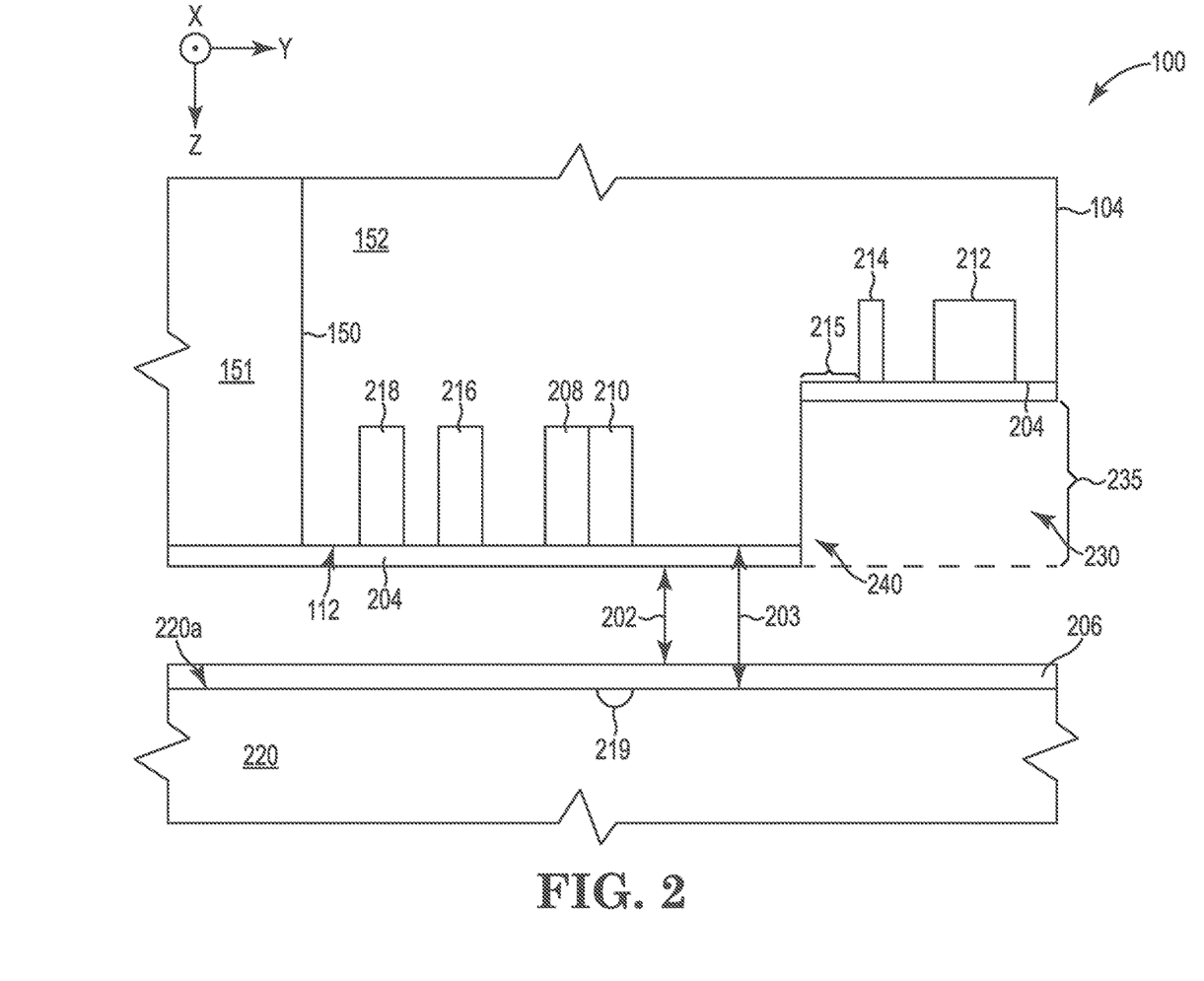
FIG. 2 is a schematic, cross-sectional view of a slider along a down-track plane according to according to a non-limiting embodiment.

In FIG. 2, a cross-sectional view shows details of a slider body 102 of recording head 100 according to an embodiment of the present disclosure. As shown in FIG. 2, recording head 100 includes a trailing edge 104, a media-facing surface 112; a write pole 210 extending to the media-facing surface 112; a near-field transducer 208 extending to the media-facing surface 112, a leading return pole 216 extending to the media-facing surface 112, a reader device (reader) 218 extending to the media-facing surface 112, and a trailing return pole 212. As shown, the leading return pole 216 is positioned between the write pole 210 and the leading edge 107 and is herein referred to as "leading return pole." Also, as shown, the trailing return pole 212 is positioned between the write pole 210 and the trailing edge 104 and is herein referred to as "trailing return pole." A magnetic coil (not shown) induces a magnetic field through the write pole 210 in response to an applied current. During recording, the waveguide 110 delivers light from a light source to the NFT 208. The NFT 208 directs surface plasmons out of the media-facing surface 112 to form a hotspot 219 within a recording layer of a moving recording medium 220. The write pole 210 sets a magnetic orientation in the hotspot 219, thereby writing data to the recording medium 220. A write head includes at least one coil (not shown), a write pole 210 and one or more return poles such as trailing return pole 212 and leading return pole 216. When current flows through the coil, a resulting magnetic field causes a magnetic flux to flow through the coil, which results in a magnetic write field emitting from the tip of the write pole 212. This magnetic field is sufficiently strong that it locally magnetizes a portion of the adjacent magnetic media, thereby recording bit of data. The write field then, travels through a magnetically soft under-layer of the magnetic medium to return to the trailing return pole 212 and leading return pole 216 of the write head. The NFT 208 may be made from a combination of optically efficient materials such as Au or Ag, and mechanically robust materials such as Rh or Ir.

A slider body 102 according to the present disclosure can be mostly made out of ceramic material. As shown in FIG. 2 a slider body includes an "AlOTiC break" 150. In the area 151 to the left of break 150, the bulk of the material is alumina titanium-carbide (also referred to as AlOTiC). In the area 152 to the right of break 150, the bulk of the material, with the exception of many of the features in the transducer region, is alumina. Devices such as electromagnetic write pole 210 are made of magnetic materials such cobalt-iron (CoFe), nickel-iron (NiFe), and the like.

Non-limiting examples of HAMR devices are described in U.S. Pat. No. 10,468,058 (Bashir et al.) and U.S. Pat. No. 11,222,657 (Seigler et al.), wherein the entirety of each of said patents is incorporated herein by reference.

Embodiments of the present disclosure include etching back an area of a slider body that includes at least the return pole between the write pole and the trailing edge, while leaving at least the NFT and write pole unetched so as to form a "pedestal" so that the etched area is recessed relative to the pedestal and media-facing surface of the head. During read/write operations, the recessed area allows at least the NFT and write pole to be positioned relatively close to the surface of recording medium as compared to if the recessed area was not created. For example, the recessed area can avoid physically interfering with the pedestal from achieving very low clearance relative to the surface of recording medium, as it might otherwise do if it was unetched because the recessed area, if left unetched, can expand to an undue degree when heated during read-write operations and prevent the NFT/write pole from achieving a relatively lower writer head-to-media separation (wHMS). Having the NFT/write pole relatively closer to the media during HAMR writing can improve performance of the HAMR head, such as reduction in required laser current ($I_{eff}$), reduction in track width that can increase areal density capacity (ADC), and increase thermal gradient (TG). At the same time, the pedestal can be large enough so that it participates in a contact detect signal (described below). In some embodiments, the pedestal can be used to generate a contact detect response with minimal burnish by selecting a pedestal of a sufficient size.

Referring to FIG. 2, recording head 100 includes a recessed portion 230 that is recessed relative to the media-facing surface 112 by a distance 235 when no power is applied to the recording head 100. At least the trailing return pole 212 is located in the recessed portion 230 and positioned between the write pole 210 and the trailing edge 104. Heat can be generated from one or more devices (e.g., a heater) in close proximity to trailing return pole 212 during read/write operations. If the recessed portion is not present, the heat can cause trailing return pole 212 to expand toward surface 220a of recording medium 220 to an undue degree and prevent the NFT 208/write pole 210 from otherwise achieving relatively lower clearance with respect to the surface 220a of recording medium 220.

The distance 235 is present when no power is applied to the transducer region of the head meaning that it is "as-manufactured" and is formed via a manufacturing process such as photolithography and layer deposition. This situation of "when no power applied" also refers to the situation if the transducer region is at a uniform temperature. In this situation, the trailing return pole 212 will be recessed relative to the media-facing surface 112 when the slider body 102 is at a uniform temperature (e.g., when the head 100 is powered off). The portion that extends to the media-facing surface 112, which includes NFT 208 and write pole 210, and that is adjacent to at least the recessed portion 230 may be referred to herein as a pedestal 240.

This is in contrast to situations where a HAMR read/write head may experience local protrusion and/or recession within the transducer region at or near the NFT 208, write pole 210, and trailing return pole 212 due to local heating and thermal expansion even though each of the NFT 208, write pole 210, and trailing return pole 212 may extend to the media-facing surface 112 of the recording head 100 when no power is applied to the head 100 or when the head 100 is at uniform temperature. In these situations, when the head is at a uniform temperature (e.g., ambient temperature, with no local heating applied near the trailing return pole 212), the trailing return pole 212 will not be recessed relative to the media-facing surface 112.

The recessed portion 230 can include one or more transducer devices in addition to trailing return pole 212. One non-limiting example of such a device is a contact detection sensor, which detects contact between the pedestal 240 and a recording medium 220. An example of such a contact detection sensor may be a temperature sensor sometimes referred to as a dual-ended, temperature coefficient of resistance (DETCR) sensor. Such a contact sensor is sensitive to sudden temperature changes that occur when the head approaches and contacts the media surface. The signal of the contact sensor is used by the clearance control system to adjust and control the head-to-media separation (HMS) (discussed below). As shown in FIG. 2, recessed portion 230 includes contact detection sensor 214, which is located downtrack from the pedestal 240 and is positioned between the pedestal 240 and the trailing return pole 212. The pedestal 240 is separated from the contact detection 214 by a distance 215 such that the contact detection sensor 214 detects contact between the pedestal 240 and a recording medium 220 during read/write operations (discussed in more detail below). In some embodiments, distance 215 is at least 0.5 μm.

The region 240 of material adjacent to the recessed portion 230 forms a pedestal 240, as mentioned above. The pedestal 240 extends to the media-facing surface 112 and includes at least the write pole 210 and the near-field transducer 208. The pedestal 240 can extend in the downtrack direction "y" beyond the write pole 210 and the near-field transducer 208 as far as desired. The pedestal 240 may extend uptrack ("–y") to include transducer components in the alumina region 152, such as the leading return pole 216 and the reader device (reader) 218. In some embodiments, the pedestal 240 could extend to and stop at any point between the NFT 208 and AlOTiC break 150 such as fourth side 247 discussed below with respect to FIG. 3.

The media-facing surface 112 is offset from the moving media surface 220a by a head-to-media spacing (HMS) 202. Unless stated otherwise, the term HMS in this disclosure is intended to describe a minimum clearance between a feature of the head and the media, which may be different at different regions of the head at a given passive fly height, e.g., distance 202 shown in FIG. 2. The passive fly height is an average fixed clearance between the media-facing surface and the media induced by air-bearing features of the head. The passive fly height does not include clearance changes caused by fixed or adjustable regions that protrude from (or are recessed from) a plane of the media-facing surface. The HMS 202 is maintained by a combination of a passive fly height and a clearance actuator (not shown), e.g., a heater. The fly height is maintained by a thin layer of gas (e.g., air, helium, or mixture thereof) between air bearing features of the head's media-facing surface 112 and the media surface 220a. The HMS 202 is a measure of the local separation between the read/write transducers and the media surface 220a, which can be adjusted dynamically by regulating an amount of current applied to the clearance actuator. There may be multiple clearance actuators, e.g., used to separately control HMS of the read transducer(s) and HMS of the write transducer(s).

In FIG. 2, a protective overcoat 204 is shown covering the media-facing surface 112. The protective overcoat 204 may include one or more layers of material. In some embodiments, the outermost layer facing the underlying recording medium can be made from an impact-resistant and corrosion resistant material such as diamond-like carbon (DLC). Optionally, a protective overcoat can include one or more adhesion layers prior to applying a DLC layer to improve the adhesion of the DLC layer. The protective overcoat 204 is shown conformably covering the recessed portion 230 and the pedestal 240. A non-limiting example a protective overcoat is described in U.S. Pat. No. 11,094,339 (Bergerud et al.), wherein the entirety of said patent is incorporated herein by reference.

Another protective overcoat 206 is shown in FIG. 2, this one covering the recording media surface 220a. The media overcoat 206 may be formed of a carbon material similar to the head overcoat 204. Note that for purposes of this discussion, the HMS 202 is shown being measured from the top of the media overcoat 206 to the bottom of the head overcoat 204. For other purposes, a distance 203 between a component at the media-facing surface 112 of the head and the magnetic media material at surface 220a may be described as the HMS. For example, the HMS-dependent performance of the write pole could be determined based on the HMS 203 and not HMS 202, as this is the distance that is spanned by the magnetic field emitted by the write pole.

Figure 3:
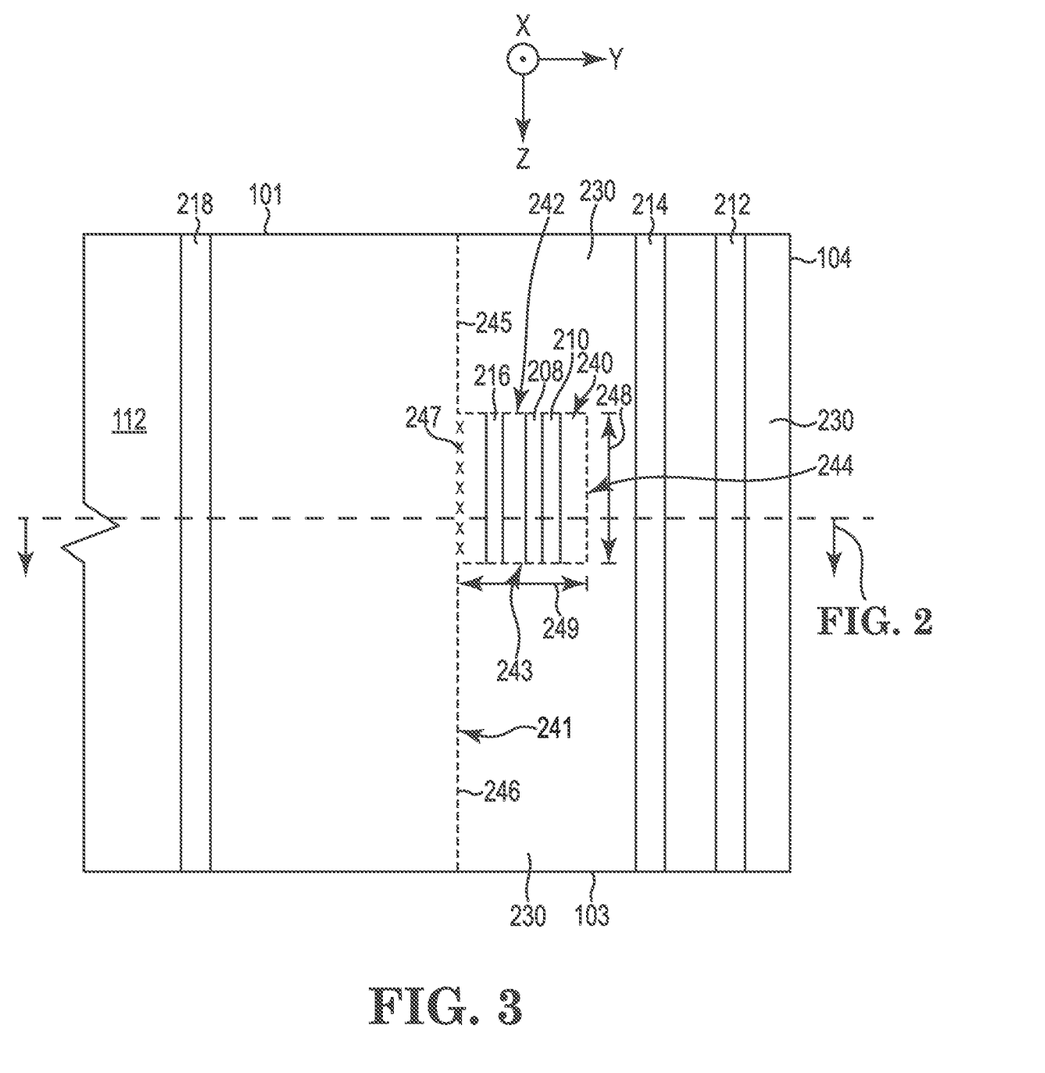
FIG. 3 is a schematic, media-facing surface view of a portion of the slider shown in FIG. 2.

FIG. 3 is a media-facing surface view of a portion of the slider shown in FIG. 2 and shows additional details of the pedestal 240. It is noted that the view in FIG. 2 relates to the view shown in FIG. 3 as indicated by the dashed line. The pedestal 240 is seen in a plan view looking at the media-facing surface 112. The border 241 of the pedestal 240 relative to the recessed portion 230 is indicated by dotted lines. The border 241 can have any shape as desired such as square, rectangular, triangular, and the like. The pedestal 240 may be formed into a shape so that it includes at least the NFT 208 and the write pole 210, but does not include transducer devices in the downtrack direction and/or crosstrack direction that may thermally expand and protrude beyond the media-facing surface 112 and interfere with the NFT 208 and write pole 210 from achieving a desired HMS.

As shown in FIG. 3, recessed portion 230 is adjacent to the pedestal 240 on at least three sides including a first side 242 between the pedestal 240 and a first side 101 of the recording head 100 in the crosstrack direction; a second side 243 between the pedestal 240 and a second side 103 of the recording head 100 in the crosstrack direction; and a third side 244 between the pedestal 240 and the trailing edge 104 in a downtrack direction.

As shown, the pedestal 240 also includes side 245 between the pedestal 240 and the trailing edge 140 and a side 246 between the pedestal 240 and the trailing edge 140. Alternatively, the recessed portion 230 could also be adjacent to the pedestal 240 on a fourth side 247 between the pedestal 240 and the leading edge 107 in the downtrack direction, as indicated by cross-hatching so as form a rectangular or square pedestal.

The two-dimensional specifications of a pedestal 240 as viewed in FIG. 3 can be selected based on factors such as manufacturing (e.g., etching) and/or operating the head 100 during read/write operations so that a target HMS is achieved for at least write pole 210 and NFT 208 without areas in the recessed portion 230 thermally expanding during read/write operations and interfering with a target HMS to an undue degree. Also, as mentioned above, the pedestal 240 can be large enough so that it participates in a contact detect signal. While FIG. 3 shows pedestal dimensions 248 and 249 as roughly equal in downtrack and crosstrack directions, these dimensions may be significantly different from each other. For example, if the pedestal dimensions affect the contact detect and clearance setting (e.g., if pedestal is too close to DETCR clearance detector) then this may prescribe tight control of the downtrack dimension of the pedestal, however significant variation in the crosstrack direction may be acceptable. If the pedestal dimension is such that clearance modulation or contact detection can be affected (e.g., pedestal area hitting disc is too large) then both downtrack and cross-track dimensions may be more tightly controlled. The pedestal 240 may have a distance 248 in the crosstrack direction that determines whether a pedestal feature participates in the contact detect signal or not. In some embodiments, the pedestal 240 may have a distance 248 in the crosstrack direction from 2 to 40 microns, from 2 to 30 microns, from 2 to 20 microns, or even from 5 to 15 microns. The pedestal 240 may have a distance 249 in the downtrack direction that that determines whether a pedestal feature participates in the contact detect signal or not. In some embodiments, the pedestal 240 may have a distance 249 in the downtrack direction from 2 to 8 microns, from 2 to 7 microns, or even from 3 to 6 microns. It is noted that the dimensions 248 and 249 are based on the pedestal being centered on the NFT 208, and that similar dimensions could be specified based on the sides 101 and 103 of the slider body.

Distance 235 can be also selected based on factors such as manufacturing (e.g., etching) and/or operating the head 100 during read/write operations so that a target HMS is achieved for at least write pole 210 and NFT 208 without areas in the recessed portion 230 thermal expanding during read/write operations and interfering with a target HMS to an undue degree. In some embodiments, distance 235 can be at least 2 nanometers, at least 2.5 nanometers, at least 3 nanometers, at least 4 nanometers, or even at least 5 nanometers. In some embodiments, distance 235 can be from 2 to 10 nanometers, from 3 to 10 nanometers, or even from 2 to 8 nanometers.

The present disclosure also includes methods of forming a media-facing surface and an etched, recessed portion in a recording head as shown in FIGS. 2 and 3.

Figure 4:
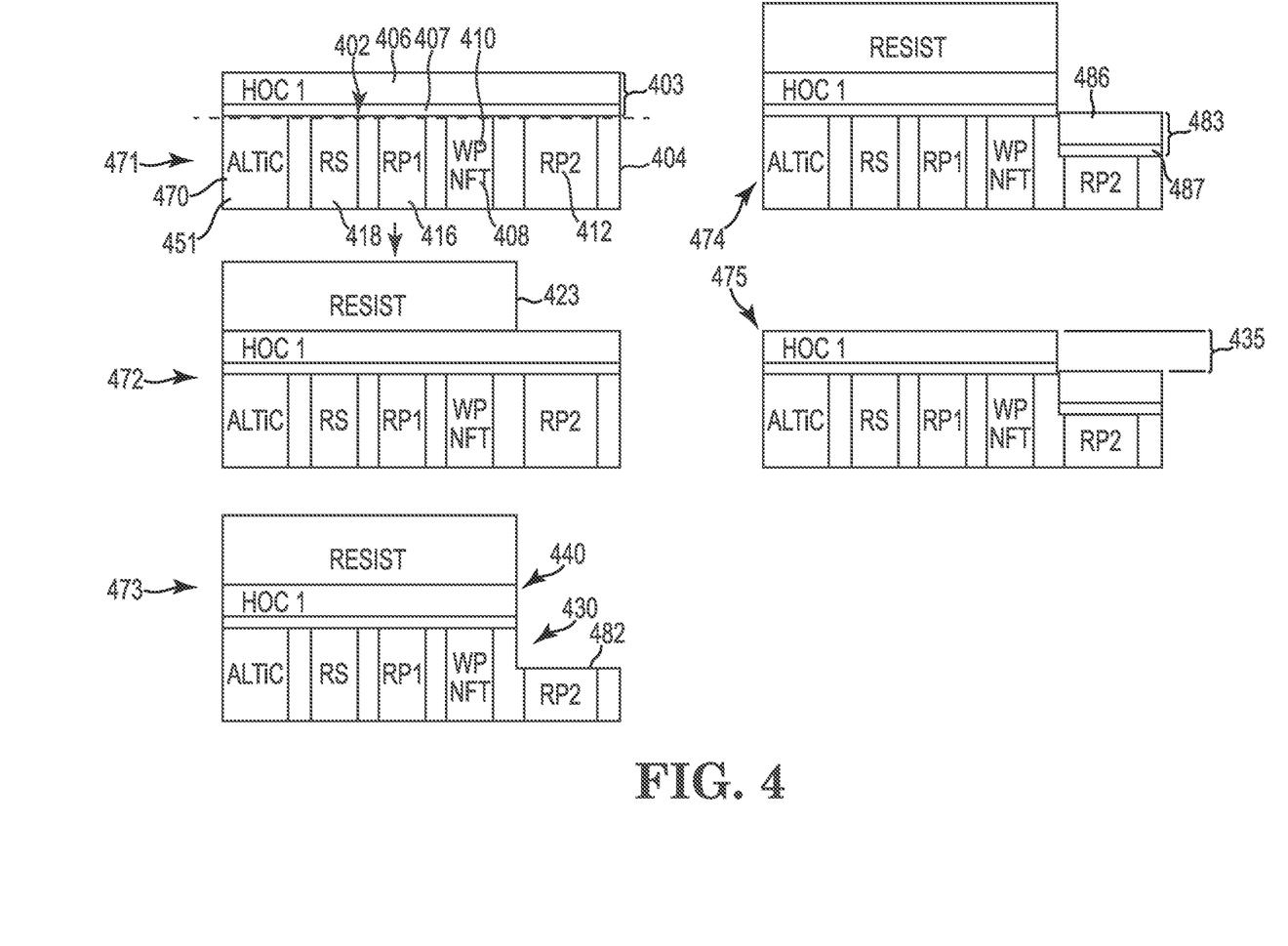
FIG. 4 is a process diagram of slider manufacture according to a non-limiting embodiment.

Recording heads (sliders) can be formed on a wafer using layer deposition and photolithography processes, and the wafer separated into slider structures, e.g., bars of sliders. A non-limiting embodiment of forming a media-facing surface and an etched, recessed portion in a recording head according to the present disclosure is illustrated with the flowchart in FIG. 4. Referring to FIG. 4, step 471 includes forming a recording head 470 that comprises at least a reader 418, a leading return pole 416, a write pole 410, a near-field transducer 408 proximate the write pole 410, and a trailing return pole 412 positioned between the write pole 410 and a trailing edge 404 of the recording head 470; lapping the surface of recording head to form a lapped surface 402; and depositing at least a first protective overcoat 403 over the lapped surface 402. One or more mechanical lapping processes remove materials from the media-facing side of the recording head 470, resulting in lapped surface 402 that exposes some components of the recording head 470, such as a reader 418, leading return pole 416, write pole 410, near-field transducer 408, and trailing return pole 412. In this example, the lapping has stopped at surface 402, which corresponds to the final lapped dimension, represented by dashed line 402.

Protective overcoat 403 can include one or more layers as similarly discussed above with respect to protective overcoat 204 in FIG. 2. As shown in FIG. 4, protective overcoat 403 includes a layer 406 of impact-resistant and corrosion resistant material such as diamond-like carbon (DLC) and an adhesion layer 407 under layer 406 to improve the adhesion of layer 406.

Step 472 includes patterning a resist or hardmask 423 in a region that is shaped through photolithography and encompasses at least the write pole 410 and the near-field transducer 408.

Step 473 includes etching the first protective overcoat 403 and lapped surface 402 with the resist or hardmask pattern to form a media-facing surface and an etched, recessed portion 430 that that is recessed relative to the media-facing surface 402 and has an etched, recessed surface 482 as a final, etched dimension, wherein the trailing return pole 412 is located in the recessed portion 430. As can be seen, the areas covered by a resist or hardmask 423 are not etched, and form pedestal 440.

Non-limiting examples of techniques for removing first protective overcoat 403 include physical techniques, chemical techniques and combinations thereof. A non-limiting example of a physical technique according to the present disclosure includes ion milling. Non-limiting examples of chemical techniques according to the present disclosure include reactive ion etching (RIE) and plasma ashing. RIE is a dry etching process that uses chemically reactive plasma to remove material deposited on a substrate. The plasma is generated under low pressure such as a vacuum (e.g., from $1 \times 10^{-3}$ Torr to 1 Torr) by an electromagnetic field. High-energy ions from the plasma attack the substrate surface and react with it. Non-limiting examples of removing a protective overcoat such as 403 are also described in described in U.S. Pat. No. 11,094,340 (Bergerud et al.), wherein the entirety of said patent is incorporated herein by reference.

Step 474 includes depositing a second protective overcoat 483 over the recessed portion 430, thereby forming a distance 435 (same as 235 discussed above with respect to FIG. 2) when no power is applied to the recording head. Protective overcoat 483 can include one or more layers as similarly discussed above with respect to protective overcoat 204 in FIG. 2. As shown in FIG. 4, protective overcoat 483 is the same as protective overcoat 403 and includes a layer 486 of impact-resistant and corrosion resistant material such as diamond-like carbon (DLC) and an adhesion layer 487 under layer 486 to improve the adhesion of layer 486.

Step 475 includes removing the resist or hardmask 423 to expose the final media-facing surface 402 and protective overcoat 403 of recording head 470.

A HAMR head implementing the recessed portion as described herein may take the pedestal into account when performing active clearance control. As noted in the description of FIGS. 2 and 3, a contact sensor can be located relative to the pedestal such the contact detection sensor detects contact between the pedestal and a recording medium.

Figure 5:
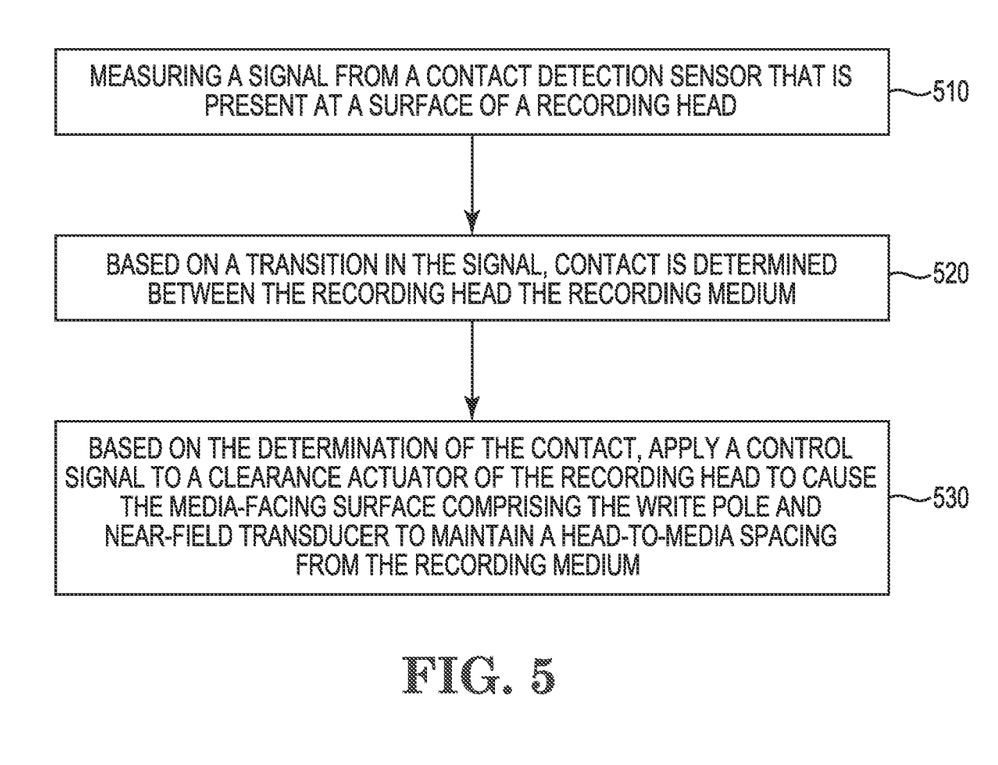
FIG. 5 is a flowchart of method according to a non-limiting embodiment.

In FIG. 5, a flowchart illustrates a method of use of a HAMR drive according to a non-limiting embodiment. The method involves measuring 510 a signal from a contact detection sensor that is present at a surface of a recording head. The recording head has a write pole extending to a media-facing surface of the recording head; a near-field transducer extending to a media-facing surface of the recording head; and a trailing return pole positioned between the write pole and the trailing edge. The trailing return pole and contact detection sensor are located in a recessed portion that is recessed relative to the media-facing surface by a distance when no power is applied to the recording head. The near-field transducer creates a hotspot on a recording medium while a magnetic field is applied to the hotspot. Based on a transition in the DETCR signal, contact 520 between the recording head and the recording medium is determined.

Based on the determination of the contact, a control signal is applied 530 to a clearance actuator of the recording head. The control signal causes the media-facing surface to maintain a head-to-media spacing from the recording medium.

In one embodiment, the contact determined 520 is between the recording head and a region of the media-facing surface that includes at least the write pole and the near field transducer (also referred to as the pedestal). In such a case, the control signal applied at 530 is set to maintain the clearance between the pedestal and the recording medium.

Figure 6:
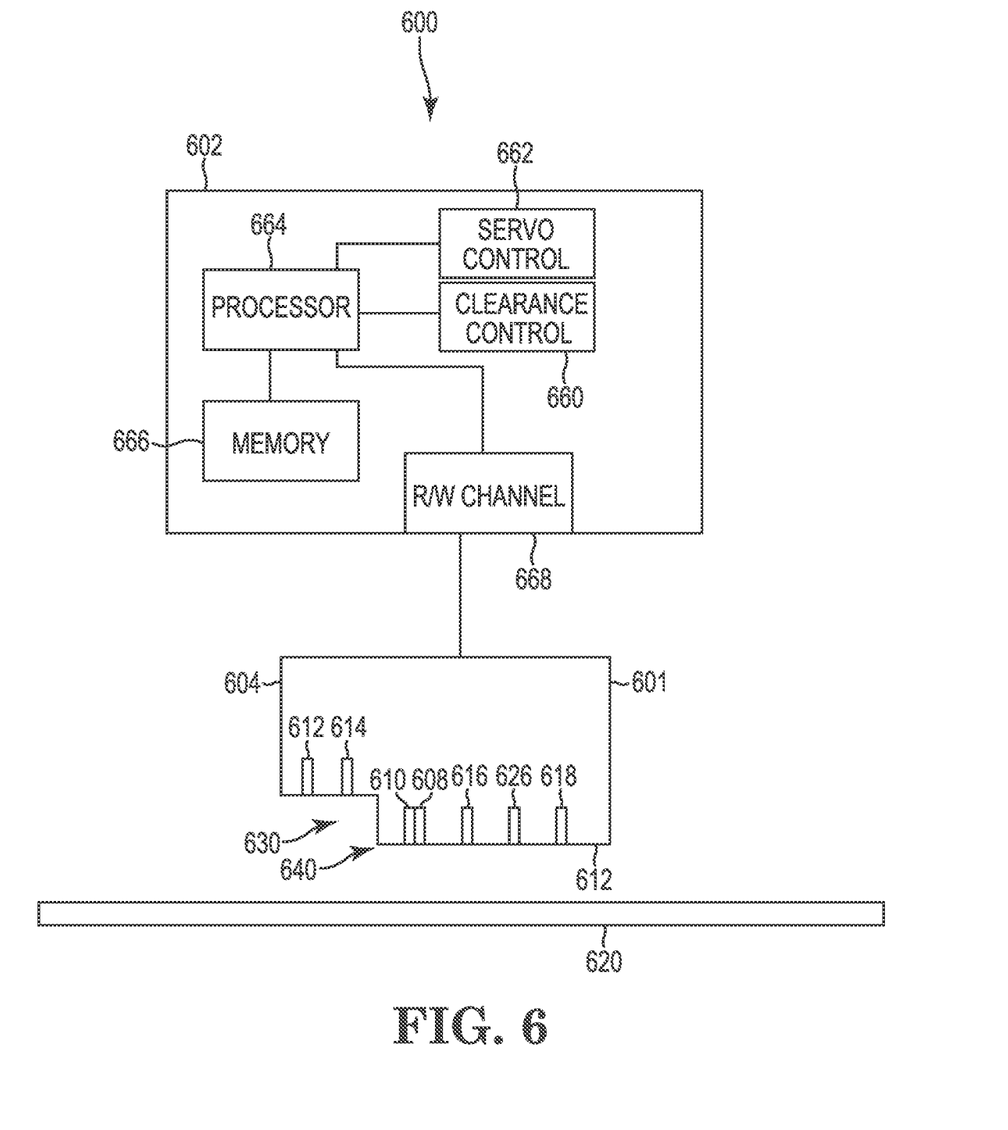
FIG. 6 is a block diagram of a disk drive apparatus according to a non-limiting embodiment.

In FIG. 6, a block diagram illustrates components of a HAMR drive 600 according to an example embodiment. The drive 600 includes circuitry 602 that may include a system on a chip (SoC), power supply, host interface circuitry, etc. The circuitry 602 may include one or more processors 664 coupled to memory 666. The memory 666 may include volatile and non-volatile memory, and is used to at least store and execute firmware of the drive 600. A read/write channel 668 is used to communicate with one or more heads 601 that read from and write to a magnetic disk 620.

The head 601 includes a trailing edge 604, a media-facing surface 612; a write pole 610 extending to the media-facing surface 612; a near-field transducer 608 extending to the media-facing surface 612, a leading return pole 616 extending to the media-facing surface 612, a reader device (reader) 618 extending to the media-facing surface 612, a trailing return pole 612, a contact detection sensor 614, and an actuator 626. At least the portion of the media-facing surface 612 that includes the write pole 610 and near-field transducer 608 form a pedestal 640. The contact detection sensor 614 is located in a recessed portion 630 relative to the media-facing surface 612, and sends a signal via the channel 668 back to a clearance control module 660. The signal may be a time varying signal that measures temperature at the media-facing surface 612. Typically, the temperature rises as the head 601 approaches the surface of the disk 620, with a sharp increase in temperature rise rate (a transition) when contact is made. This transition is due to frictional heating at the interface of the head 601 and the disk 620 during the contact.

The clearance control module 660 uses the signal to send a control signal to the clearance actuator 626 located near the media-facing surface 612. This actuator 626 may include a heater that causes local deformation of the media-facing surface 612 due to thermal expansion of the head material. More than one contact detection sensor 614 may be used as well as more than one clearance actuator 626. For example, different head-to-media spacings may be maintained for a read transducer 618 during reading and a write transducer (which includes NFT 608 and write pole 610) during writing. Different heaters and/or contact detection sensors may be used in the different modes.

Generally, a servo control subsystem 662 schedules operations of the heads.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

What is claimed is:

1. A recording head, comprising:
   a trailing edge;
   a leading edge;
   a media-facing surface;
   a write pole extending to a media-facing surface of the recording head;
   a near-field transducer extending to a media-facing surface of the recording head;
   a trailing return pole positioned between the write pole and the trailing edge; and
   a recessed portion that is recessed relative to the media-facing surface by a distance when no power is applied to the recording head, wherein the trailing return pole is located in the recessed portion.

2. The recording head of claim 1, wherein the distance is at least 2 nanometers.

3. The recording head of claim 1, further comprising a leading return pole extending to a media-facing surface of the recording head, wherein the leading return pole is positioned between the write pole and the leading edge.

4. The recording head of claim 1, wherein a region of material adjacent to the recessed portion forms a pedestal relative to the recessed portion, wherein the pedestal extends to the media-facing surface and comprises at least the write pole and the near-field transducer.

5. The recording head of claim 4, wherein the recessed portion is adjacent to the pedestal on at least three sides comprising:
   a first side between the pedestal and a first side of the recording head in a crosstrack direction;
   a second side between the pedestal and a second side of the recording head in the crosstrack direction; and
   a third side between the pedestal and the trailing edge in a downtrack direction.

6. The recording head of claim 5, wherein the media-facing surface of the pedestal extends to the trailing edge in a downtrack direction.

7. The recording head of claim 5, wherein the recessed portion is adjacent to the pedestal on a fourth side between the pedestal and the leading edge in the downtrack direction.

8. The recording head of claim 4, further comprising a contact detection sensor that is located downtrack from the pedestal, wherein the pedestal is separated from the contact detection such that the contact detection sensor detects contact between the pedestal and a recording medium during read/write operations.

9. The recording head of claim 8, wherein the contact detection sensor is located between the pedestal and the trailing return pole.

10. The recording head of claim 4, further comprising a contact detection sensor that is located downtrack from the pedestal, wherein the pedestal is separated from the contact detection sensor by at least 0.5 μm.

11. The recording head of claim 1, further comprising a protective overcoat over the media-facing surface and the recessed portion.

12. A method of forming a media-facing surface and an etched, recessed portion in a recording head, wherein the method comprises:
   forming a recording head that comprises at least a write pole, a near-field transducer proximate the write pole, and a trailing return pole positioned between the write pole and a trailing edge of the recording head;
   lapping the surface of recording head to form a lapped surface;
   depositing at least a first protective overcoat over the lapped surface;
   patterning a resist or hardmask in a region that encompasses at least the write pole and the near-field transducer;
   etching the first protective overcoat and lapped surface with the resist or hardmask pattern to form a media-facing surface and an etched, recessed portion that that is recessed relative to the media-facing surface by a distance when no power is applied to the recording head, wherein the trailing return pole is located in the recessed portion;
   depositing a second protective overcoat over the recessed portion; and
   removing the resist or hardmask.

13. The method of claim 12, wherein distance is at least 2 nanometers.

14. The method of claim 12, wherein the first protective overcoat comprises a diamond-like carbon layer, and wherein the second protective overcoat comprises a diamond-like carbon layer.

15. The method of claim 14, wherein the first protective overcoat further comprises at least one adhesion layer between the diamond-like carbon layer and the lapped surface, and wherein the second protective overcoat further comprises at least one adhesion layer between the diamond-like carbon layer and the recessed portion.

16. The method of claim 12, wherein a region of material adjacent to the recessed portion forms a pedestal relative to the recessed portion, wherein the pedestal extends to the media-facing surface and comprises at least the write pole and the near-field transducer.

17. A method of determining contact between a recording head a recording medium, wherein the method comprises:
measuring a signal from a contact detection sensor that is at a media-facing surface of a recording head, the recording head comprising a write pole extending to a media-facing surface of the recording head; a near-field transducer extending to a media-facing surface of the recording head; and a trailing return pole positioned between the write pole and the trailing edge, wherein the trailing return pole and contact detection sensor are located in a recessed portion that is recessed relative to the media-facing surface by a distance when no power is applied to the recording head;
based on a transition in the signal, determining contact between the recording head the recording medium; and
based on the determination of the contact, applying a control signal to a clearance actuator of the recording head, the control signal causing the media-facing surface comprising the write pole and near-field transducer to maintain a head-to-media spacing from the recording medium.

18. The method of claim 17, wherein a region of material adjacent to the recessed portion forms a pedestal relative to the recessed portion, wherein the pedestal extends to the media-facing surface and comprises at least the write pole and the near-field transducer, and wherein contact is between the recording medium and the pedestal.

19. The method of claim 18, wherein the contact detection sensor is located between the pedestal and the trailing return pole.

20. The method of claim 18, wherein the detection sensor is located downtrack from the pedestal, wherein the pedestal is separated from the contact detection sensor by at least 0.5 µm.

* * * * *